United States Patent [19]
Dilling et al.

[11] Patent Number: 5,972,047
[45] Date of Patent: Oct. 26, 1999

[54] AMINE MODIFIED SULFONATED LIGNIN FOR DISPERSE DYE

[75] Inventors: Peter Dilling; Gamini S. Samaranayake, both of Mt. Pleasant; Staci L. Waldrop, Charleston, all of S.C.

[73] Assignee: Westvaco Corporation, New York, N.Y.

[21] Appl. No.: 09/037,353

[22] Filed: Mar. 10, 1998

[51] Int. Cl.[6] .......................................................... D06P 1/50
[52] U.S. Cl. .......................... 8/552; 8/557; 8/662; 8/905; 8/912; 8/913; 8/915; 8/561
[58] Field of Search ................................ 8/524, 552, 554, 8/905, 912, 557, 913, 662, 561

[56] References Cited

U.S. PATENT DOCUMENTS

| | | | |
|---|---|---|---|
| 2,709,696 | 5/1955 | Weish et al. | 260/124 |
| 2,863,780 | 12/1958 | Ball, Jr. | 106/14 |
| 4,732,572 | 3/1988 | Dilling | 8/557 |
| 4,764,597 | 8/1988 | Dilling | 530/501 |

*Primary Examiner*—Margaret Einsmann
*Attorney, Agent, or Firm*—Terry B. McDaniel; Daniel B. Reece, IV; Richard L. Schmalz

[57] ABSTRACT

Dyestuff compositions are provided which incorporate amine modified sulfonated lignins. The disclosed dyestuff compositions exhibit improved heat stability and, as a result of the higher activity of the amine modified sulfonated lignin, less dispersant is present in the exhaust liquor and waste treatment demands are thereby reduced. The presence of tertiary amine groups in sulfonated kraft, sulfomethylated kraft, and sulfite lignins provide dispersants with package dyeing heat stabilities significantly better than those of the unmodified lignins. The improved package dyeing grinding aid/dispersant of the invention is prepared by reacting sulfonate lignin with a secondary amine using formaldehyde and alkaline conditions.

11 Claims, No Drawings

AMINE MODIFIED SULFONATED LIGNIN FOR DISPERSE DYE

BACKGROUND OF THE INVENTION

1. Field of the Invention

This invention relates to disperse dye compositions incorporating modified sulfonated lignins (lignosulfonates). More particularly, this invention relates to dispersed dye compositions prepared with amine modified sulfonated lignins as dispersants or as grinding aids. Most particularly, this invention is related to dispersed dye compositions of improved heat stability for use primarily in package dyeing.

2. Description of Related Art (Including Information Disclosed Under 37 CFR 1.97 and 37 CFR 1.98)

Dyestuff compositions generally comprise a dye cake, itself comprising a dye and a dispersant and/or diluent. These dyestuff compositions are widely used to color both natural and synthetic fibers. In the dyestuff composition, the dispersant serves three basic functions: (1) it assists in reducing the dye particle to a fine size; (2) it maintains a dispersing medium; and (3) it is used as a diluent.

Dye dispersants are generally one of two major types: (1) sulfonated lignins from the wood pulping industry (via either the sulfite pulping process or the kraft pulping process) where lignocellulosic materials, such as wood, straw, corn stalks, bagasse, and the like, are processed to separate the cellulose or pulp from the lignin or (2) naphthalene sulfonates from the petroleum industry. The present invention relates to sulfonated lignin dye dispersants. More particularly, the instant invention relates to amine modified sulfonated lignin in combination with disperse dyes. Disperse dye compositions employing sulfonated lignins as dispersants is well known.

Sulfite (or bisulfite) wood pulping process lignin is recovered from the spent pulping liquor, known as "black liquor," as lignosulfonates; whereas, kraft (or sulfate) wood pulping process lignin is recovered from the black liquor as the sodium salt of lignin (products marketed under the Indulin® mark by Westvaco Corporation). This recovered sulfate lignin is subjected to sulfonation or sulfomethylation for use as dye dispersants, such as products marketed under the Polyfon®, Kraftsperse®, and Reax® marks by Westvaco Corporation. As used herein, the term "sulfonated lignins" may be used generally to refer to lignosulfonates, sulfonated lignins, or sulfomethylated lignins as before described.

The advantages of employing sulfonated lignins as dispersants in dyestuff compositions are (1) availability and (2) unique physical properties, which include good compatibility to many dye systems and outstanding dispersant characteristics at ambient and elevated temperatures. There are, however, a number of disadvantages in employing lignins as dispersants, whether they are sulfite lignosulfonates or kraft-derived sulfonated lignins. These negative factors include fiber staining (as lignin in dry powder form is brown in color) and heat stability (as the dyeing process is conducted at elevated temperatures) of the lignins employed. These adverse properties are troublesome to dyers and many attempts have been made to overcome these disadvantages.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. U.S. Pat. No. 4,001,202 describes a process for preparing a sulfonated lignin with improved fiber staining properties useful as a dye dispersant by reacting lignin with an epihalohydrin. Also, U.S. Pat. No. 4,338,091 teaches reacting a modified lignin with sodium sulfite and an aldehyde; the lignin having been modified by a pretreatment with sodium dithionate.

Additional examples of reacting or modifying lignins to make them more suitable as dye dispersants include U.S. Pat. Nos. 4,184,845, 4,131,564, 3,156,520, 3,094,515, 3,726,850, 2,680,113, and 3,769,272. The art cited is meant to show the state of the art and is not intended to be all inclusive of lignin modifications.

Although the methods for treating and preparing sulfonated lignins described above offer some advantage during dyeing, none has produced a product possessing the improvements obtained by the improved products made according to the claimed process.

During the dyeing process, only the dye exhausts itself onto the fiber where it becomes an intimate part of the fiber. The lignin and other dyeing adjuvants, which are left in the exhaust liquor, need to be subsequently treated in primary and secondary waste treatment facilities. Although lignin is a natural material, lignosulfonates are considered relatively poorly biodegradable (albeit more biodegradable than synthetic dispersants from the petroleum industry), and they are often viewed as environmentally unfriendly as they often exceed the capacity of dye houses or municipality waste water treatment facilities.

One solution to this problem would be to increase the dye dispersant activity of lignin dispersants. (The term "activity" refers to the relative amount of dispersant required to function effectively. The less dispersant required to perform, the higher its activity; whereas the more dispersant required to perform, the lower is its activity.) Such enhanced activity would permit reduced dosages required for dyeing and thereby lessen the existing waste water treatment problems.

Therefore, it is the general object of this invention to provide sulfonated lignins of improved properties to enhance their usefulness as dye dispersants.

A particular object of this invention is to increase the activity of sulfonated lignin dispersants.

Another object of this invention is to provide a process for improving the heat stability of dye formulations including sulfonated lignins.

Other objects, features and advantages of this invention will be seen in the following detailed description of the invention.

SUMMARY OF THE INVENTION

The above stated objects of the invention are achieved in the provision of dyestuff compositions incorporating amine modified sulfonated lignins. The invention dyestuff compositions exhibit improved heat stability and, as a result of the higher activity of the amine modified sulfonated lignin, less dispersant is present in the exhaust liquor and waste treatment demands are thereby reduced. The presence of tertiary amine moieties in sulfonated kraft, sulfomethylated kraft, and sulfite lignins provides dispersants with package dyeing heat stabilities significantly better than those of the unmodified sulfonated lignins.

DESCRIPTION OF THE PREFERRED EMBODIMENT(S)

Sulfonated lignins are highly negatively charged polyelectrolytes, due to the presence of fully ionizable sulfonate groups that are pH-independent as to its ionization.

During grinding of dispersed dyes, a charged dispersant can prevent the re-agglomeration of finely ground particles, and also, like-charge repulsion prevents the cohesive interaction of dispersant molecules and keeps the viscosity of the solution low, aiding grinding. On the other hand, dyeing of polyester requires low pH conditions of approximately pH 4.5, where sulfonated lignins still exist as a highly negatively charged species, which in some instances does not provide adequate protection for dye particles under high temperature and high shear conditions in package dyeing. The situation requires an enhanced surface coverage on dye particles by the dispersant.

It is envisioned that an auxiliary group consisting of a tertiary amine attached to the sulfonated lignin that can exist in cationic form under dyeing conditions (i.e., acidic pH), could provide a neutralization mechanism for neighboring sulfonated lignin molecules on the dye surface, thereby increasing the surface coverage. The presence of tertiary amine groups would not affect the negative charge at grinding pH (i.e., alkaline), because the amines exist in the uncharged form. This, would provide a single dispersant for both formulation and dyeing. Such would greatly simplify the whole dyeing process.

Carefully selecting an amine of a proper acidity constant ($pK_a$), achieves the above described desired disperse dye dispersant. Formaldehyde condensation of an amine with sulfonated lignins is an instance of the well-known Mannich reaction. The Mannich reaction process has been demonstrated in several patents: U.S. Pat. No. 4,017,475, with simple amines including dialkanol amines; Canadian Patent 1,018,520, with primary aliphatic amines; U.S. Pat. No. 4,562,236, 1985, with fatty amines; and U.S. Pat. No. 5,188,665, with polyamines.

Japanese Patent publication 07224135 describes the use of amino acid-modified lignin as a dispersant for dyeing fabrics. This preparation is not suitable for package dyeing applications because it would have a very high viscosity at formulation conditions and would tend to precipitate at polyester package dyeing conditions at pH 4.5. Laboratory testing of this approach (using 2-methylgycine, amino acid) proved to be unsuccessful in this respect.

What has been discovered, however, is that the selection of suitable amines and the desirable amount of amine modification (based on their acidity constant) allows prediction of the dispersant-viscosity behavior of the modified sulfonated lignin dispersant at basic pH and also at acidic pH. Amines of various forms are suitable to provide a tertiary amine group on the sulfonated lignin structure. Preferred amines are secondary amines, and among the most preferred secondary amines, based on their $pK_a$ values and flash points, are those listed in Table I.

TABLE I

| Secondary Amines | | |
|---|---|---|
| Amine | $pK_a$ | Flash point (° C.) |
| Imidazole | 6.95 | 145 |
| 2-methylimidazole | 7 | — |
| Morpholine | 8.3 | 35 |
| Sarcosine | 10 | — |
| Pyrrolidine | 10.1 | 37 |
| Dimethylamine (40%) | 10.7 | 15 |
| Diethylamine | 11.1 | -28 |
| Dibutylamine | 11 | 41 |
| Diethanolamine | 9 | 149 |
| Diisopropanolamine | 8.5 | 12.6 |

The amine modification of sulfonated lignin approach is based on amine ionization principles which are dependent on the amine $pK_a$, which in turn dictates lignin solubility at a given pH and, thus, performance.

Once secondary amines are attached to the lignin, they are unique in that they exist at alkaline pH in their tertiary form and do not interfere with the anionic character of the negatively charged sulfonate groups. As pH is lowered, the amines assume a positive charge, which can neutralize a portion of the anionic moieties in the negatively charged lignin. The resulting reduced solubility of the lignin enhances its interaction with the dyestuff particle and results in a higher activity dispersant. Laboratory investigations have shown that to achieve similar heat stability as REAX 85A, the industry standard, amine modified sulfonated lignins allow 50% or greater dosage reduction in "mother paste" package dyeing heat stability. (See Heat Stability Testing section below.)

The materials prepared were evaluated for their dispersion stabilities and package dyeing heat stabilities. The general trends realized in these preparations were that, with increasing amine content, amine modified sulfonated lignins showed greater package dyeing heat stability. However, by increasing the amine content, the dispersant's viscosity increases at low pH. In aminomethylation of sulfonated lignins, since the maximum level of substitution is determined by the $pK_a$ of the amine, selection of an amine with very low acidity (e.g., imidazole, $pK_a$=7), the substitution level can be as much as about 16 wt. % and still maintain the desired viscosity and solubility. Whereas, with an amine of high $pK_a$ (e.g., dimethylamine, $pK_a$=10), the maximum substitution level can only be about 8 wt. %.

Amine modification of sulfonated lignins for use in dyestuff compositions permits the use of higher sulfonated lignin during milling and general formulation while lowering the solubility at acidic pH for improving the dye bath stability during the high temperature, high shear package dyeing environment. The resulting lower dosage requirement has the potential to make higher strength dye liquids which should translate into added benefits for many dyestuff producers in addition to the environmental benefits resulting from the lower dispersant requirement.

Ideally, the amine needed for a standard disperse dyeing should have a $pK_a$ as low as possible, as typical dyestuff formulations occur at alkaline pH conditions of about 8.0–8.5. At this pH, the amine would not interfere with the solubility of the lignin precursor. At dyeing conditions of pH about 4.0–5.0, the amine is protonated, which neutralizes a portion, or all, of the negatively charged sulfonic and carboxylic acids in the lignin molecular portion backbone. The extent of charge neutralization is dictated by the number of negatively charged groups in the lignin and the protonated fraction of amine groups.

For the purposes of this invention, the substitution level (wt. % amine) and the $pK_a$ values include those that result in optimum dispersed dye dispersants with various amines, including dimethylamine, imidazole, morpholine, piperazine, and aminoethylpiperazine when used in preparation of liquid and powder formulations with various azo dyes (e.g., Orange 30, Blue 79, and Red 167) and various anthraquinone dyes (e.g., Red 60 and Blue 60).

Preparation of Aminomethylated Lignosulfonates

A 20–25% aqueous solution is prepared by gradual addition of dry sulfonated lignin (lignosulfonate) powder (preferably selected from the group of commercially available sulfonated lignins/lignosulfonates consisting of POLYFON O®, REAX 85A®, POLYFON H®, Vanisperse CB®, Marasperse CBA®, Ufoxane RG®, Ultrazine NA®, and Lignosol SD60®) to water maintained at 40° C., and the solution pH is adjusted to 10.6 with 50% NaOH. The prepared solution is treated with an amine (preferably selected from the group of amines consisting of dimethylamine, morpholine, imidazole, and 2-methylimidazole) followed by addition of an equimolar amount of formaldehyde, and the combination is then heated at 90° C. for 3–12 hr. For the purposes of the following examples, the molar amounts of amine used per 1000 g of sulfonated lignin/lignosulfonates are 0.5, 0.075, 1.0 and 2.0.

Heat Stability Testing

The primary dispersant to be evaluated is weighed (0.5 g based on solids) into a 100 mL beaker and mixed with 2.0 g of dyestuff to form a "mother paste" (prepared by grinding 15 g of a disperse dye with 5 g of a commercially available grinding agent) and 5 mL of a buffer solution (pH=5.5). For a proper (i.e., fair) comparative evaluation, the mother paste is formed by grinding the disperse dye with the grinding agent to a standard particle size. Then, aliquots are withdrawn from the formed mother paste to which the dispersant is added. This assures that all dispersants are tested under standardized conditions.

The total weight is adjusted to 50 g with deionized (DI) water. The well-stirred mixture's pH is adjusted to between 4.5–5.0 using a 25% solution of acetic acid. The package dyeing process begins by pouring the dye sample into the dye chamber of a laboratory package dyer. The dyeing cycle consists of heating the dye bath from 70° C. to 130° C. at 2 degrees per minute while recording the pressure at a constant flow rate. Temperature versus the differential pressure is recorded during the dyeing cycle. If instability occurs, the pressure increases until the dyestuff solubilizes, after which the pressure decreases to its original level. This represents what is referred to as the "dyeing curve." The area under the curve then is recorded as package dyeing heat stability (bar ° C.). Ideally, the area under the curve should be zero (0). All experimental samples were tested with disperse Orange 30 dye as the primary screening test.

EXAMPLE 1

Dosage studies of aminomethylated REAX 85A, POLYFON O, and POLYFON H were conducted and compared with the dosage requirements of unmodified REAX 85A, considered the industry standard dyestuff dispersant for package dyeing. Results are presented in Table II.

TABLE II

Dosage Response of Aminomethylated REAX 85A, POLYFON O and POLYFON H

| Lignin Type | Acid Point (g) | HS (bar ° C.) @ 100% Dosage | HS (bar ° C.) @ Reduced Dosage | Reduced Dosage (%) |
|---|---|---|---|---|
| REAX 85A (05026) | 2.1 | 20.6 | — | — |
| REAX 85A (05026) + 0.75 Mole DMA | 0.4 | 6.1 | 24.6 | 20 |
| REAX 85A (05026) + 1.0 Mole DMA | 0.4 | 5.1 | 24.3 | 15 |
| REAX 85A (05026) + 2.0 Moles DMA | 0.4 | 0 | 22.3 | 10 |
| POLYFON H (05136) | 1.2 | 22.3 | — | — |
| POLYFON H (05136) + 1 Mole DMA | 0.1 | 7.1 | 25.4 | 15 |
| POLYFON O(03306) | 3.6 | 24.3 | — | — |
| POLYFON O(03306) + 1 Mole DMA | 0.4 | 5.1 | 15.1 | 20 |
| POLYFON O(03306) + 1 Mole DMA | 0.4 | 5.1 | 17.5 | 17 |
| POLYFON O (03306) + 1 Mole DMA | 0.4 | 5.1 | 23.6 | 15 |

The preparations generated from POLYFON O and REAX 85A showed improvements were formulated in liquid and powder form. The optimum amine substitution levels and suitable amines were determined by evaluation of these samples according to their dispersion stability and package dyeing heat stability.

EXAMPLE 2

A 20–25% aqueous solution of POLYFON O was prepared by the gradual addition of dry POLYFON O powder to water maintained at 40° C., and the solution pH was adjusted to 10.6 with 50% NaOH. The solution was treated with the amine, followed by formaldehyde, and was heated at 90° C. for 3–12 hours under atmospheric pressure.

The following tests were performed according to standard laboratory procedures: package dyeing at pH 4.5 on a Zeltex Colorstar PC 1000 (Werner Mathis); AATCC heat stability test (No. 167); and acid point based on the weight of 10N sulfuric acid required to precipitate a dispersant from a 6% aqueous solution. The package dyeing heat stability results are shown in Table 3.

TABLE 3

Package Dyeing Heat Stability of Amine Modified Sulfonated Lignins

| Sample | Wt % of Amine substitution | Acid Point | HS (bar ° C.) Sample/REAX 85A Blue 79 | Orange 30 |
|---|---|---|---|---|
| REAX 85A | | 1.8 | 11.2/11.2 | 19/19 |
| POLYFON O | | 3.6 | 23.7/11.2 | 24/19 |

TABLE 3-continued

Package Dyeing Heat Stability of Amine Modified Sulfonated Lignins

| Sample | Wt % of Amine substitution | Acid Point | HS (bar ° C.) Sample/REAX 85A | |
|---|---|---|---|---|
| | | | Blue 79 | Orange 30 |
| PolyO + 1.0 mol imidazole | 6 | 0.6 | 6.7/11.2 | 7.9/19 |
| PolyO + 2.0 mol imidazole | 12 | 0.07 | 9.6/16.7 | 7.6/19 |
| PolyO + 1.0 mol 2-methylimidazole | 8 | 1.0 | 10.2/11.2 | 7.42/19 |
| PolyO + 2.0 mol 2-methylimidazole | 16 | 0.08 | 8.7/16.4 | 5.2/21.6 |
| PolyO + 1.0 mol morpholine | 8 | 0.1 | 11.8/17.1 | 7.23/19 |
| PolyO + 2.0 mol morpholine | 16 | 0.09 | 5.1/16.4 | 0/19 |

Morpholine modified POLYFON O showed improved Orange 30 package dyeing heat stability reaching perfect heat stability with a degree of modification at 2.0 mole of amine. Imidazole and 2-methylimidazole modified POLYFON O did not improve appreciably beyond the 1.0 mole level. For Blue 79, the 2.0 mole modifications performed better than the 1.0 mole modifications for all the derivatives, as well as unmodified REAX 85A; the morpholine modification performed best overall.

The examples herein are intended to be representative only and not all inclusive of the scope of the subject matter of the disclosed invention. The invention is further set forth and defined in the claims which follow.

That which the inventors consider as the subject matter of the invention include:

(1) A dyestuff composition comprising a dyecake comprising a disperse dye and an amine modified sulfonated lignin dispersant;

(2) The dyestuff composition of (1) wherein the disperse dye is a member of the group consisting of azo dyes and anthraquinone dyes;

(3) The dyestuff composition of (2) wherein the azo dyes are selected from the group consisting of Orange 30, Blue 79, and Red 167;

(4) The dyestuff composition of (2) wherein the anthraquinone dyes are selected from the group consisting of Red 60 and Blue 60;

(5) The dyestuff composition of (1) wherein the amine modified sulfonated lignin is the product of combining an amine and a sulfonated lignin, in the presence of an aldehyde;

(6) The dyestuff composition of (5) wherein the sulfonated lignin is selected from the group of lignins from the alkali pulping processes which have been subsequently sulfonated and lignosulfonates from the sulfite pulping process;

(7) The dyestuff composition of (6) wherein the sulfonated alkali lignins are selected from sulfonated and sulfomethylated kraft lignins;

(8) The dyestuff composition of (5) wherein the amine is a tertiary amine;

(9) The dyestuff composition of (8) wherein the amine is selected from the group consisting of dimethylamine, morpholine, imidazole, sarcosine, pyrrolidine, diethylamine, dibutylamine, diethanolamine, diisopropanolamine, and 2-methylimidazole;

(10) The dyestuff composition of (5) wherein the aldehyde is formaldehyde; and

(11) The dyestuff composition of (1) wherein the amine modified sulfonated lignin dispersant exhibits an improved activity over the sulfonated lignin not modified with amine permitting a reduced dosage of at least 20% to achieve the same level of activity as the dosage required of unmodified sulfonated lignin.

What is claimed is:

1. A dyestuff composition comprising a dyecake comprising a disperse dye and aminomethylated sulfonated lignin dispersant.

2. The dyestuff composition of claim 1 wherein the disperse dye is a member of the group consisting of azo dyes and anthraquinone dyes.

3. The dyestuff composition of claim 2 wherein the azo dyes are selected from the group consisting of C.I. Disperse Orange 30, C.I. Disperse Blue 79, and C.I. Disperse Red 167.

4. The dyestuff composition of claim 2 wherein the anthraquinone dyes are selected from the group consisting of C.I. Disperse Red 60 and C.I. Disperse Blue 60.

5. The dyestuff composition of claim 1 wherein the amine modified sulfonated lignin is the product of combining an amine and a sulfonated lignin, in the presence of an aldehyde.

6. The dyestuff composition of claim 5 wherein the sulfonated lignin is selected from the group of lignins from the alkali pulping processes which have been subsequently sulfonated and lignosulfonates from the sulfite pulping process.

7. The dyestuff composition of claim 6 wherein the sulfonated alkali lignins are selected from sulfonated and sulfomethylated kraft lignins.

8. The dyestuff composition of claim 5 wherein the amine is a secondary amine.

9. The dyestuff composition of claim 8 wherein the amine is selected from the group consisting of dimethylamine, morpholine, imidazole, sarcosine, pyrrolidine, diethylamine, dibutylamine, diethanolamine, diisopropanolamine, and 2-methylimidazole.

10. The dyestuff composition of claim 5 wherein the aldehyde is formaldehyde.

11. The dyestuff composition of claim 1 wherein the amino methylated sulfonated lignin dispersant exhibits an improved activity over the sulfonated lignin not aminomethylated permitting a reduced dosage to achieve the same level of activity as the dosage required of unmodified sulfonated lignin.

* * * * *